Aug. 13, 1963
J. C. OWEN
3,100,612
ANGLE OF ATTACK CONTROL
Original Filed July 24, 1957
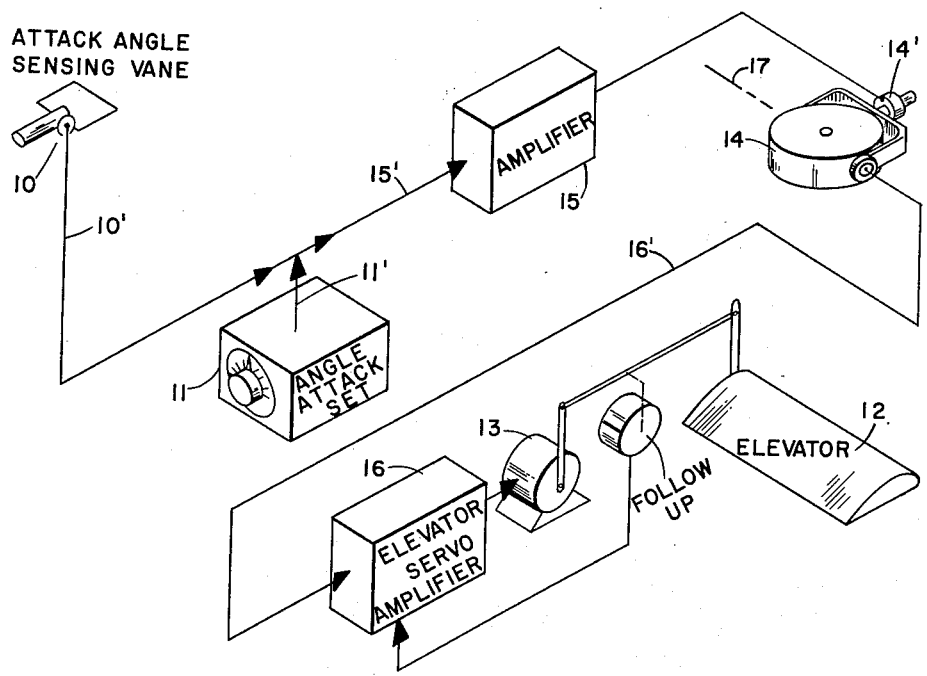
INVENTOR.
JOHN C. OWEN United States Patent Office
3,100,612
Patented Aug. 13, 1963

3,100,612
ANGLE OF ATTACK CONTROL
John C. Owen, Grand Rapids, Mich., assignor, by mesne assignments, to Lear Siegler, Inc., Santa Monica, Calif., a corporation of Delaware
Original application July 24, 1957, Ser. No. 673,808, now Patent No. 2,967,679. Divided and this application June 28, 1960, Ser. No. 66,393
6 Claims. (Cl. 244—77)

The present invention relates to a method of automatically controlling an aircraft to angle of attack as averaged and smoothed by an inertial control device and the apparatus therefor.

This patent application is a restricted application based upon patent application Serial No. 673,808, filed July 24, 1957, by John C. Owen, for "Angle of Attack Control," now U.S. Patent 2,967,679.

At the present time the method for controlling an aircraft to an angle of attack involves an angle of attack sensor located on the aircraft in such a manner as to sense the angle of attack of the aircraft relative to the incident airflow. This sensor dictates and transmits signals, electrical or otherwise, in relation to the angle of attack at which the aircraft is flying. The sensor is usually used in conjunction with a zero resetting angle of attack setting device, set either manually or automatically for a desired pre-selected angle of attack, and deviations therefrom by the aircraft result in signals being generated for indication and/or control purposes. In systems using automatic control, such for example as an automatic pilot, these signals indicating a departure from the pre-selected angle of attack are fed directly into the pitch channel of the autopilot. The autopilot then manipulates the elevator of the aircraft and causes the aircraft to fly at the prescribed angle of attack as measured by the sensor. These same signals may provide an indication in the aircraft from which the pilot may manually control the aircraft to the selected angle of attack when an autopilot is not being used.

In usual practices the control signals from the angle of attack sensor are fed more or less directly to the autopilot elevator servo channel. The elevator of the aircraft then responds directly to movements of the angle of attack sensor. Flight through turbulent air causes considerable perturbations of the angle of attack sensor, these perturbations being transmitted via the autopilot to the aircraft's elevator. The result is a high degree of activity on the aircraft elevator, this activity being reflected on the control stick in the cockpit. In addition, the aircraft is proportionately active in the pitch attitude. These situations can cause considerable concern to the pilot and the passengers. Furthermore, depending on the authority allowed to the autopilot, control can become sufficiently violent so as to damage or destroy the aircraft.

The present invention has for its purpose the elimination of these aforementioned deficiencies and problems heretofore encountered by usual angle of attack control systems, by averaging the dictations of the angle of attack sensor (and angle of attack setting device) by means of an inertial device.

Another purpose of this invention is to eliminate the aforementioned undesirable pitching effects of turbulence when under control of angle of attack without any sacrifice in the overall desired performance of the aircraft under automatic control.

A further objective of this invention is to provide a method for controlling the aircraft elevator to accommodate the variation or turbulence in the incident airflow to obtain smooth flight through turbulent air while under the control of an angle of attack sensor.

A still further objective of this invention is to provide a method for controlling an aircraft which is responsive to the air flow in front of the aircraft to cause the aircraft to fly on a long term basis as an aerodynamic body to a selected angle of attack, but to fly for the short term periods of turbulence as an inertial body.

A further objective of the invention is to provide devices or apparatus for controlling an aircraft in accordance with the desired method of control.

In the present invention there is provided an angle of attack sensor physically located on the aircraft so as to sense the alignment of the flow of the incident air mass relative to the aircraft and generate or dictate a sensor signal. In conjunction with the angle of attack sensor is a setting device which may be operated either manually or automatically to provide a selected angle of attack to which the aircraft and its related base signal is to be controlled. The combination of the sensor signal and its associated setting device or base signal dictates an output signal which represents the departure of the aircraft from the selected angle of attack. An inertial device, such for example as a conventional vertical gyroscope or an integrating rate gyroscope, or the like, properly oriented within the aircraft, averages the output signal and develops an elevator control signal which is fed into an elevator control system consisting of an amplifier and a servo motor connected to the aircraft elevator. The elevator is positioned in accordance with control signal input to the amplifier in a manner usual with conventional automatic pilots.

In the present invention the signals emanating from the combination of the angle of attack sensor and the setting device bias the gyroscope or other inertial device and the signal developed by the inertial device controls the elevator servo positioning system.

For purposes of description and not of limitation, the structure for carrying out the method may take detailed physical form as hereinafter described and as illustrated in the accompanying drawing in which the only figure represents an angle of attack control schematic of a typical device of this invention.

The embodiment of the invention as illustrated in the FIGURE demonstrates the coordination of the sensor with an automatic pilot to control the elevators of an aircraft. It is understood that the sensor signals provided by the sensor may be used to indicate needed changes to the pilot who can manually operate the elevators when the automatic pilot is not being used. The reference character 10 refers to the angle of attack sensor which is usually positioned on the aircraft to engage the air in advance of the aircraft. In this case, the angle of attack sensor 10 employs a synchro-type pickoff of design commonly used in the industry and, therefore, not detailed in the drawing.

The system is also provided with an absolute angle of attack setting device 11 which also employs a synchro, the device 11 being positioned in the cockpit of the aircraft for adjustment by the pilot or automatically. The figure further illustrates schematically the elevator 12 of the aircraft which is controlled by or manipulated by an elevator servo 13. Power for the elevator servo 13 is dependent on the output signals from the sensor 10 and setting device 11 which signals are fed through amplifier 15 and precess the pitch gyro 14 to produce an output signal from the latter which is then amplified by the amplifier 16. The amplifier 15 is connected between the sensor 10 in conjunction with the setting device 11, and the torquer 14' on the gyroscope 14, while the amplifier 16 is interconnected between the gyroscope 14 and the elevator servo 13.

The connection, wiring and specific physical structures used for transmitting signals or power or for connecting the various parts may be of any conventional design as commonly used in the industry. Similarly, the gyroscope, the servo and the amplifiers may be of any design suitable for the purpose and such as are commonly used in similar applications.

The system operates as follows: The pilot adjusts the angle of attack at which he desires to fly the aircraft by means of the angle of attack setting device 11. The sensor 10 feels the air in which the aircraft is about to fly to determine instantaneous changes which should be accounted for so that the aircraft will fly at the pilot's desired angle of attack. The signals 10' and 11' from the sensor 10 and the attack setting device 11 provide signal 15' which is fed through the amplifier 15 to the torquer 14' to cause precession of the vertical gyroscope 14 about its pitch axis 17. Conventional gravitational erection has been removed from the gyroscope and the torquer precesses the gyroscope wheel in response to only the signals from the amplifier 15. This precession of the gyroscope wheel provides an output or control signal 16' from the pitch axis of the gyroscope which is fed to the elevator servo channel of the autopilot or to the elevator servo amplifier 16 and then to the elevator servo 13 which manipulates the elevator 12. The elevator servo 13 manipulates the elevator 12 to position it to pitch the aircraft to null out the gyroscope pitch axis signal 16'. If the attained attitude of the aircraft does not satisfy the differential output of the sensor 10 and attack setting device 11, the gyroscope continues to precess until that output is satisfied. When that output is satisfied, the torquers stop precessing the gyroscope so that the gyroscope maintains a fixed attitude in space and the aircraft continues to fly oriented in pitch about this attained position of the vertical gyroscope.

Signals from the sensor as a result of turbulent air or other perturbations are filtered out and only a relatively smooth signal is fed to the elevator channel, the turbulent signals which would otherwise cause concern and possible damage being rendered harmless. In other words, only gradual adjustment to the average angle of attack is attained. During high frequency disturbances, the aircraft is controlled by the pitch or vertical gyroscope in a normal fashion as well known in the field of automatic pilot systems.

It is to be noted that the major difficulties and problems heretofore encountered have been overcome and that the objectives of the present invention have been attained. With this system the desired angle of attack may be maintained through flight in smooth or steady air. At the same time, if the sensor encounters turbulent air conditions, the signal is trimmed or tempered by an inertial device before it is fed to the servo controlling the elevators, thereby preventing jerking or undue straining of the mechanical parts of the plane.

It is understood that various modifications and details in the arrangements of the parts may be had without departing from the spirit and scope of the invention as hereinafter claimed.

I claim:
1. In an angle of attack control system for aircraft having an elevator and a signal operated actuator therefor, the combination comprising:
   a desired absolute angle of attack electrical signal setting means for providing a desired absolute angle of attack signal,
   a sensor responsive to instantaneous airflow changes in advance of the aircraft and providing an instantaneously changeable sensor signal,
   means merging said signals into an angle of attack error signal,
   a pitch gyroscope having a pitch axis and a pitch axis torquer biased by said modified angle of attack signal to precess said gyroscope about said pitch axis, said gyroscope providing a control signal dependent upon the precessing of said pitch gyroscope and thereby controlling said actuator to obtain said absolute angle of attack.

2. The structure of claim 1 wherein said setting device is manually positionable to provide a desired signal.

3. An elevator control system for aircraft for positioning the elevator to obtain an angle of attack in an airflow having stable and varying air masses, said system comprising:
   a desired absolute angle of attack electrical signal setting means, for providing a desired absolute angle of attack signal, which alone represents the signal needed to obtain the angle of attack for stable air conditions;
   sensor means instantaneously responsive to changes in the direction of incident airflow and providing a sensor signal which alone represents the signal needed to obtain the instantaneous angles of attack for varying air conditions;
   a gyroscope adapted to be biased about an axis simultaneously by both of said signals and providing an output signal; and
   a servo mechanism responsive to said output signal and connected to said elevator to position the elevator to obtain the angle of attack corresponding to said desired absolute angle of attack electrical signal.

4. The structure as defined in claim 3 wherein said gyroscope is a vertical gyroscope having a torquer on an axis thereof connected to be responsive to both of said signals.

5. The structure as defined in claim 3 wherein said gyroscope is an integrating rate gyroscope.

6. An aircraft attack angle control apparatus comprising:
   means responsive to instantaneous angle of attack and having an output electrical signal which is a function of said instantaneous angle of attack;
   a desired absolute angle of attack electrical signal setting means, for providing a desired absolute angle of attack signal;
   means combining the aforesaid two signals to form a third signal which is a function of the difference between the said two combined signals,
   gyroscopic means having torquing means upon one axis thereof, to provide for precession of said gyroscope, said third signal being connected to control said torquing means;
   angular detecting means connected to said gyroscopic means to detect precession thereof; and
   means responsive to the angle of precession of said gyroscopic means for controlling the angle of attack of said aircraft.

References Cited in the file of this patent
UNITED STATES PATENTS 2,752,792     Draper et al. _____ July 3, 1956
2,742,324     Jude et al. _____ July 8, 1958